US008537583B2

(12) United States Patent
Yamamoto

(10) Patent No.: US 8,537,583 B2
(45) Date of Patent: Sep. 17, 2013

(54) LOAD DRIVER, IMAGE FORMING APPARATUS, LOAD DRIVING METHOD, AND COMPUTER PROGRAM PRODUCT

(75) Inventor: Naohiro Yamamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 274 days.

(21) Appl. No.: 13/185,738

(22) Filed: Jul. 19, 2011

(65) Prior Publication Data

US 2012/0020705 A1 Jan. 26, 2012

(30) Foreign Application Priority Data

Jul. 21, 2010 (JP) ................................ 2010-164182
Jun. 28, 2011 (JP) ................................ 2011-143544

(51) Int. Cl.
*H02M 7/00* (2006.01)

(52) U.S. Cl.
USPC .............................. 363/124; 399/88; 399/285

(58) Field of Classification Search
USPC .................................. 363/124; 399/88, 285
See application file for complete search history.

(56) References Cited

U.S. PATENT DOCUMENTS 7,680,427 B2 * 3/2010 Nakazawa ..................... 399/88
2006/0034109 A1 * 2/2006 Benabdelaziz et al. ....... 363/125

FOREIGN PATENT DOCUMENTS

JP 11-338418 12/1999

* cited by examiner

*Primary Examiner* — Walter L Lindsay, Jr.
*Assistant Examiner* — Roy Y Yi
(74) *Attorney, Agent, or Firm* — Oblon, Spivak, McClelland, Maier & Neustadt, L.L.P.

(57) ABSTRACT

A load driver applies pulse voltages to a first capacitive load that includes a first electrode and a second electrode and a second capacitive load that includes a third electrode and a fourth electrode. The load driver further includes a capacitor, at least one coil, and a driver. The driver connects the second capacitive load, the capacitor, and the coil to release charge from the third electrode to the capacitor, connects, after completion of releasing the charge to the capacitor, the first capacitive load, the second capacitive load, and the coil to release charge from the first electrode to the fourth electrode, connects, after completion of releasing the charge to the fourth electrode, the first capacitive load, the capacitor, and the coil to release charge from the capacitor to the second electrode, whereby the pulse voltages of opposite phases is applied.

13 Claims, 19 Drawing Sheets

LOAD DRIVER, IMAGE FORMING APPARATUS, LOAD DRIVING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-164182 filed in Japan on Jul. 21, 2010 and Japanese Patent Application No. 2011-143544 filed in Japan on Jun. 28, 2011.

BACKGROUND OF THE INVENTION

1. Field of the Invention

The present invention relates to a load driver, an image forming apparatus, a load driving method, and a computer program product.

2. Description of the Related Art

As a method used by an image forming apparatus of generating a toner cloud in order to develop an image, there is a method in which pulses of opposite phases are applied to the core metal and the surface electrode of a developing roller. In this method, the core metal and the surface electrode of the developing roller form a capacitive load.

Such application of pulses to both ends of a capacitive load is also used in the field of plasma displays. The problem with load drivers that charge or discharge a capacitive load is large power consumption. A technology to cause an energy transfer by using LC resonance so as to reduce the power consumption is already known. For example, in Japanese Patent Application Laid-open No. 11-338418, in order to reduce the power consumption, a technique using a driving method to apply voltage pulses alternately to both terminals of a capacitive load (a display cell of a plasma-display panel) is proposed in which a capacitive load is divided into two blocks, the voltage phase of each block is shifted, and thus charge is supplied to or released from the capacitive load of each block by making use of resonance.

However, in the method of Japanese Patent Application Laid-open No. 11-338418, while a voltage is applied to one of the capacitive loads, both terminals of the other capacitive load are equipotential. That is, voltage pulses of opposite phases cannot be applied to both ends of a capacitive load. In cloud development, a toner cloud is generated by applying voltage pulses of opposite phases to both ends of a capacitive load, and therefore, conventional methods, such as that of Document 1, cannot be applied to cloud development.

SUMMARY OF THE INVENTION

It is an object of the present invention to at least partially solve the problems in the conventional technology.

According to an aspect of the present invention, there is provided a load driver that applies pulse voltages to a first capacitive load and a second capacitive load, the first capacitive load including a first electrode and a second electrode and the second capacitive load including a third electrode and a fourth electrode. The load driver includes a capacitor, at least one coil, and a driver that connects the second capacitive load, the capacitor, and the coil to release charge from the third electrode to the capacitor, connects, after completion of releasing the charge to the capacitor, the first capacitive load, the second capacitive load, and the coil to release charge from the first electrode to the fourth electrode, connects, after completion of releasing the charge to the fourth electrode, the first capacitive load, the capacitor, and the coil to release charge from the capacitor to the second electrode, whereby the pulse voltages of opposite phases is applied to the first capacitive load and the second capacitive load from each other.

According to another aspect of the present invention, there is provided a load driving method performed by a load driver that applies pulse voltages to a first capacitive load including a first electrode and a second electrode and to a second capacitive load including a third electrode and a fourth electrode, the load driver including a capacitor and at least one coil. The load driving method includes connecting the second capacitive load, the capacitor, and the coil to release charge from the third electrode to the capacitor, connecting, after the releasing of the charge to the capacitor is completed, the first capacitive load, the second capacitive load, and the coil to release charge from the first electrode to the fourth electrode, connecting, after the releasing of the charge to the fourth electrode is completed, the first capacitive load, the capacitor, and the coil to release charge from the capacitor to the second electrode.

According to still another aspect of the present invention, there is provided a computer program product that includes a non-transitory computer-usable medium having computer-readable program codes embodied in the medium The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a load driver, an image forming apparatus, a load driving method, and a computer program according to the present invention will be described in detail below with reference to the accompanying drawings.

First Embodiment

As a developing unit of an image forming apparatus, a developing unit using a method of generating a toner cloud to develop an image is known. For example, there is a developing unit including a plurality of electrodes that extend in the direction perpendicular to the rotational direction of a developing roller and that are arranged at a predetermined interval on the developing roller. A toner cloud is generated by applying antiphase cloud pulses between adjacent electrodes, or between an electrode and a lower-layer conductive base material with an insulating layer provided in between, and the developing roller rotates and moves so that the toner is conveyed and thus the toner image is developed on a photosensitive element. Because such a developing unit has an insulating layer between electrodes, a capacitance load is formed.

Figure 1:
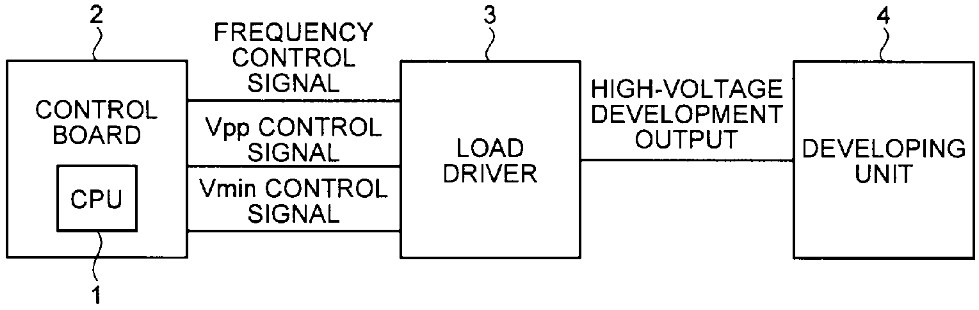
FIG. 1 is a block diagram for a configuration example of an image forming apparatus including a developing unit that performs cloud development.

FIG. 1 is a block diagram of a configuration example of an image forming apparatus including the developing unit described above. The image farming apparatus includes a control board 2, a load driver 3, and a developing unit 4 that performs cloud development.

The control board 2 controls whole of the image forming apparatus and includes a CPU 1. The CPU 1 reads a computer program stored in a memory, such as a read only memory (ROM) (not shown) to control the load driver 3.

The load driver 3 that is a high-voltage power supply to apply a cloud pulse to the developing unit 4 generates a cloud pulse according to a frequency control signal, a Vpp control signal, and a Vmin control signal that are transmitted from the control board 2. The frequency control signal controls the frequency of the cloud pulse, the Vpp control signal controls the pulse height of the cloud pulse, and the Vmin control signal controls the minimum value of the cloud pulse.

Figure 2:
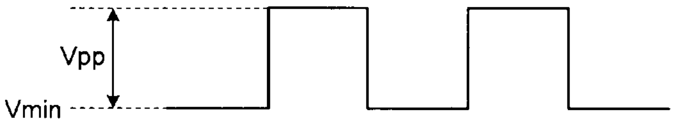
FIG. 2 is a diagram illustrating a cloud pulse.

FIG. 2 is a diagram illustrating a cloud pulse. As shown in FIG. 2, the pulse height of the cloud pulse is Vpp and the minimum value of the cloud pulse is Vmin. The frequency of the cloud pulse, Vpp, and Vmin are controlled to obtain an optimum cloud pulse according to the temperature and humidity environment as well as an image density. Hereinafter, for brevity of the explanation, the state of the cloud pulse will be described with the pulse height and the minimum value, which are respectively denoted by H and L.

Figure 3:
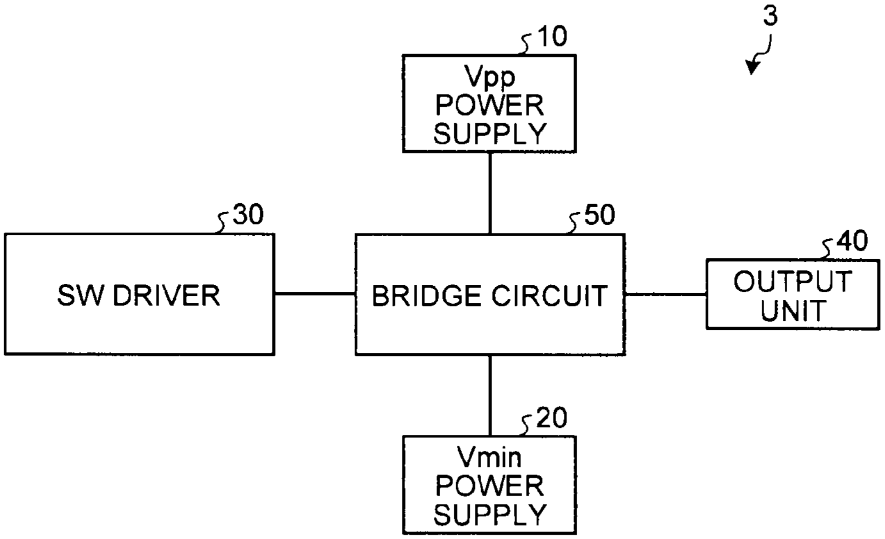
FIG. 3 is a block diagram for a configuration example of a load driver according to a first embodiment.

FIG. 3 is a block diagram of a configuration example of the load driver 3. The load driver 3 includes a SW driver 30, a bridge circuit 50, a Vpp power supply 10, a Vmin power supply 20, and an output unit 40.

The Vpp power supply 10 is a power supply that outputs a voltage value of Vpp, as shown in FIG. 2. The Vmin power supply 20 is a power supply that outputs a voltage value of Vmin, as shown in FIG. 2. When it is sufficient that the lower limit value or the upper limit value is at ground potential, the Vmin power supply 20 is unnecessary.

The SW driver 30 controls each switch (described below) included in the bridge circuit 50. Accordingly, a cloud pulse of which the minimum value is Vmin and of which the pulse height is Vpp is input from the bridge circuit 50 to the developing unit 4 via the output unit 40. For the switches, high-voltage filed effect transistors (FETs) are used, for example. Each FET is turned on or off by the SW driver 30 at a predetermined timing.

Figure 4:
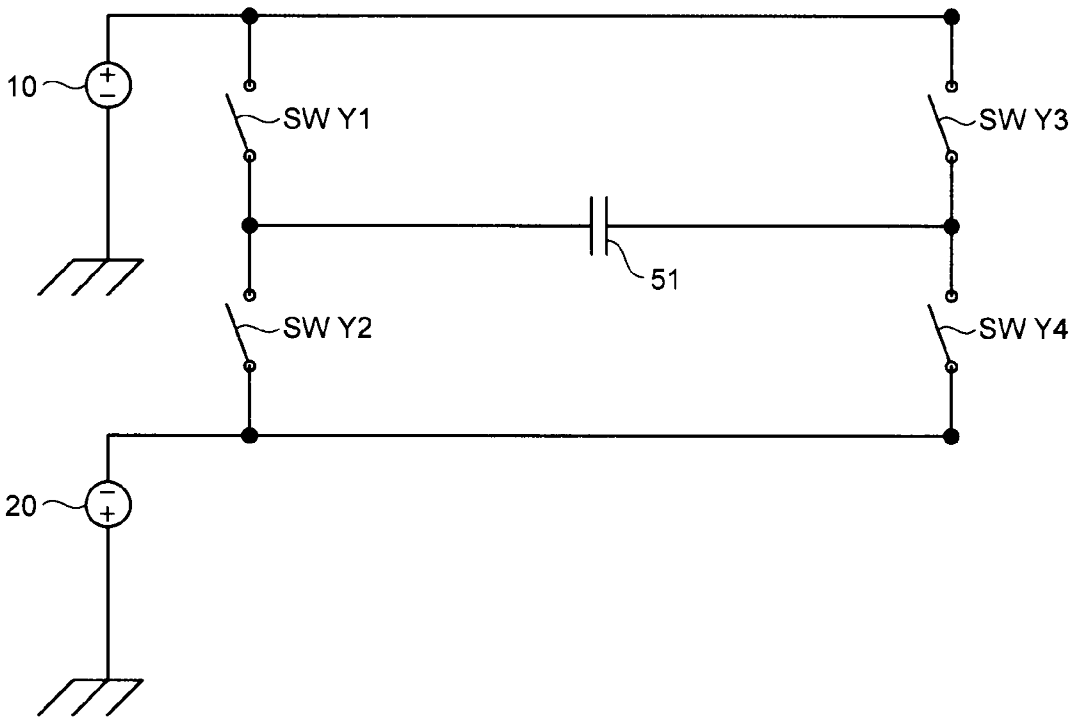
FIG. 4 is a diagram illustrating a bridge circuit.

FIG. 4 is a diagram illustrating the bridge circuit 50. Note that only a part of the bridge circuit 50 necessary for the description is illustrated in FIG. 4. The entire configuration of the bridge circuit will be described below with reference to FIG. 5.

The bridge circuit 50 includes SW Y1 to SW Y4 as switches. A load capacity 51 corresponds to the developing unit 4 in FIG. 1 that forms a capacitive load. SW Y1 to SW Y4 are turned on/off by the SW driver 30 in FIG. 3 at predetermined timings. When SW Y1 and SW Y4 are turned on and SW Y3 and SW Y2 are turned off, the potential at the left terminal of the load capacity 51 becomes H and that at the right terminal becomes L. When SW Y1 and SW Y4 are turned off and SW Y3 and SW Y2 are turned on, the potential at the left terminal of the load capacity 51 becomes L and that at the right terminal becomes H.

For example, in the case of the developing unit 4 that performs cloud development, as described with reference to FIG. 1, it is necessary to apply a cloud pulse to a plurality of capacitive loads (developing unit 4) with the number same as that of the stations of the image forming apparatus. If the image forming apparatus has four stations corresponding to four colors (Y, M, C, K), the number of capacitive loads (developing unit 4) is four. An example in which the image forming apparatus includes two capacitive loads (developing unit 4) will be described below.

Figure 5:
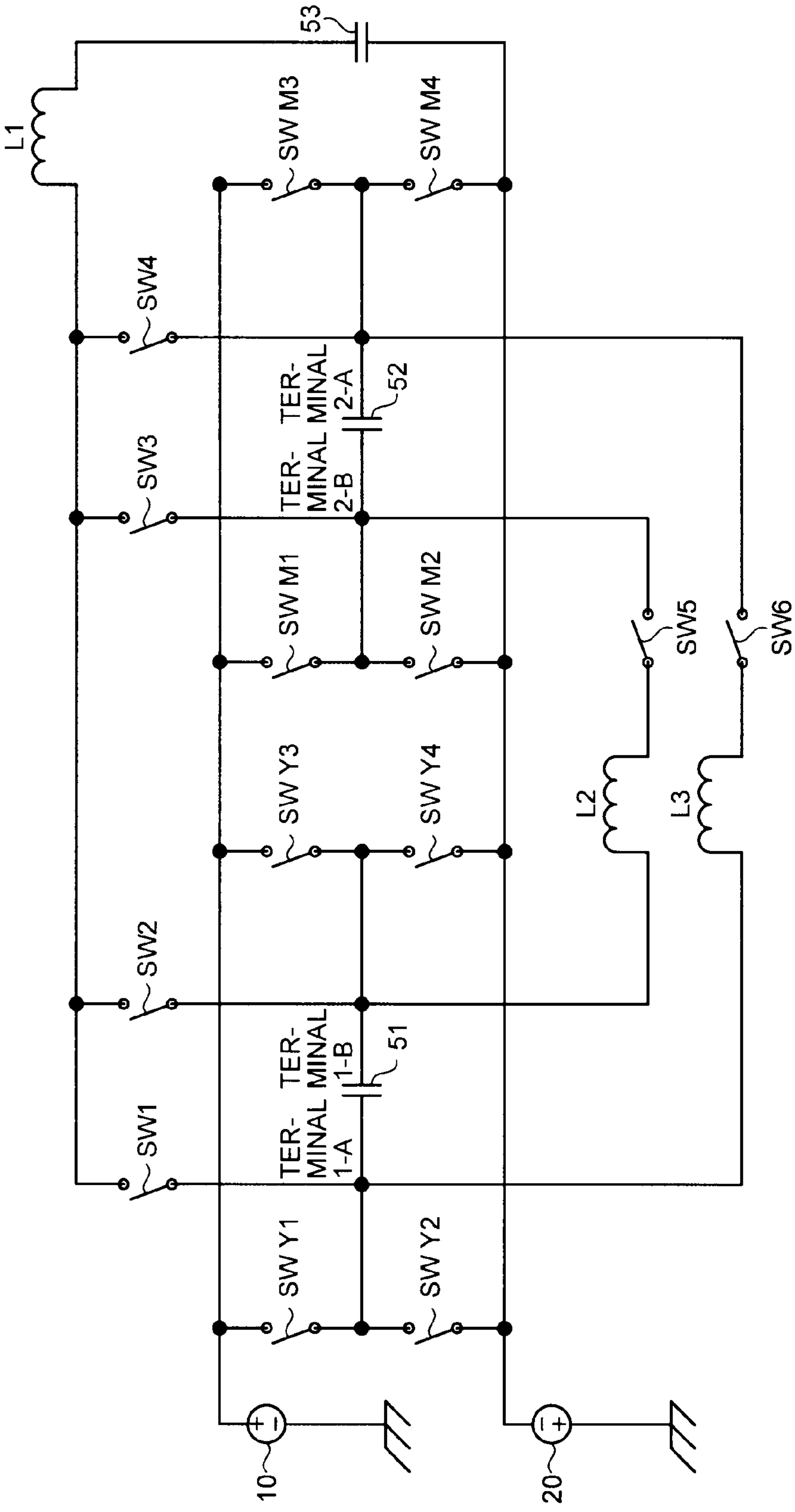
FIG. 5 is a diagram for a detailed configuration example of the load driver including the entire bridge circuit.

FIG. 5 is a detailed diagram of a configuration example of the load driver 3, including the entire bridge circuit 50. As shown in FIG. 5, the load driver 3 includes, in addition to the Vpp power supply 10 and the Vmin power supply 20 which are shown in FIG. 3, an external capacitor 53 and coils (inductors) L1 to L3. The external capacitor 53 is a capacitor to supply charge that is provided independently of the load capacities 51 and 52. The load capacities 51 and 52 correspond to the two capacitive loads (developing unit 4).

The load capacity 51 is connected to the Vpp power supply 10 via the switches (SW Y1 and SW Y3) and connected to the Vmin power supply 20 via the switches (SW Y2 and SW Y4). The load capacity 52 is connected to the Vpp power supply 10 via switches (SW Ml and SW M3) and connected to the Vmin power supply 20 via switches (SW M2 and SW M4).

Terminals 1-A and 1-B of the load capacity 51 and terminals 2-A and 2-B of the load capacity 52 are connected to the external capacitor 53 via the switches (SW1, SW2, SW3, and SW4) and the coil L1. The terminal 1-A is connected to the terminal 2-A via a switch (SW6) and the coil L3. The terminal 1-B is connected to the terminal 2-B via a switch (SW5) and the coil L2.

Turning on/off of each switch (SW1 to SW6, SW Y1 to SW Y4, SW M1 to SW M4) in FIG. 5 is controlled by the SW driver 30.

Figure 6:
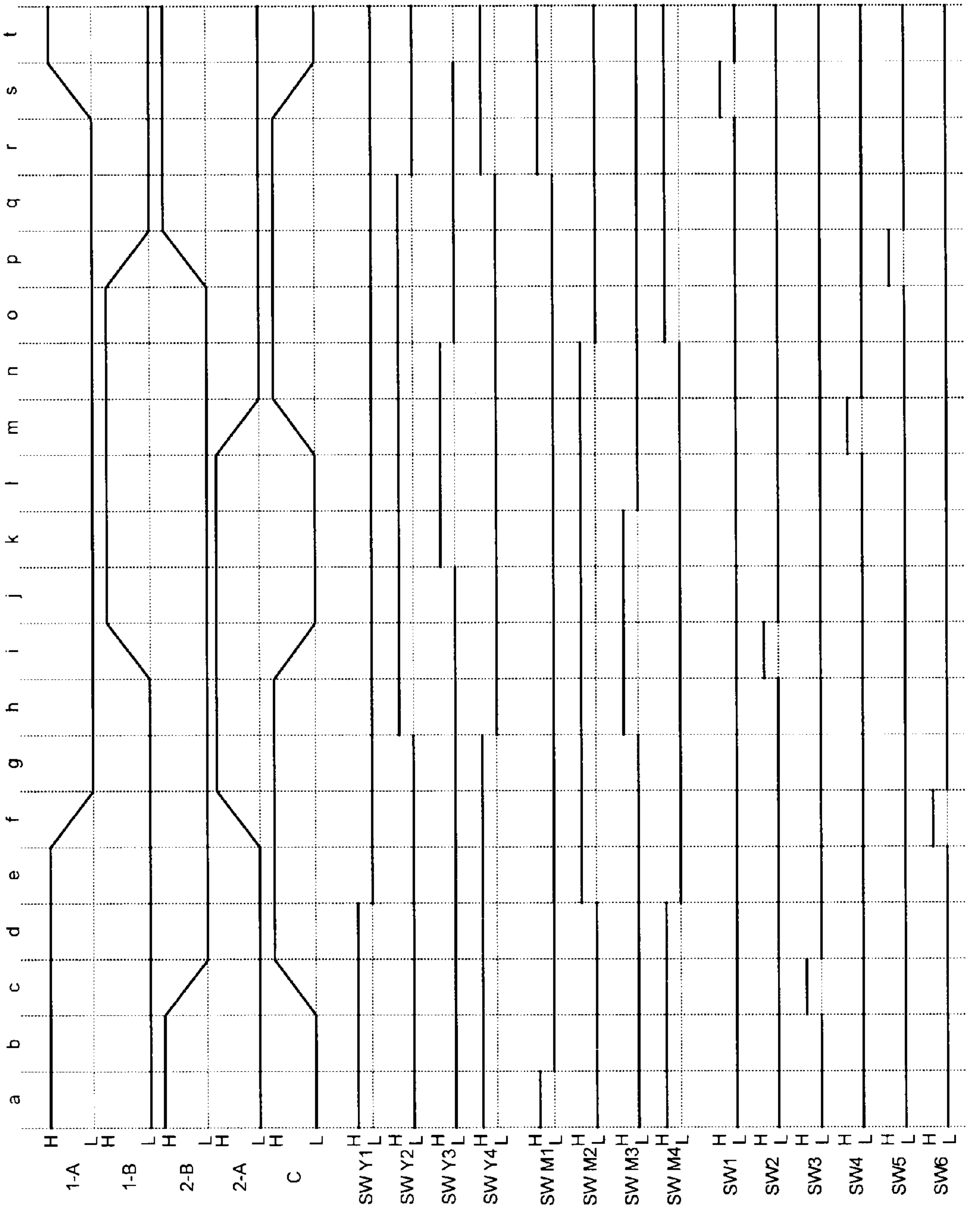
FIG. 6 is a time chart of an operation example of the load driver that drives two capacitive loads.

FIG. 6 is a time chart of an operation example of the load driver 3 that drives two capacitive loads. "1-A", "1-B", "2-A", and "2-B" in FIG. 6 represent the potentials of the terminal 1-A, the terminal 1-B, the terminal 2-A, and the terminal 2-B, respectively, whereas "C" represents the potential of the external capacitor 53. The potential of H corresponds to Vmin+Vpp and the potential of L corresponds to Vmin. Regarding SW Y1 to SW Y4, SW Ml to SW M4, and SW1 to SW6, H represents that a switch is turned on and L represents that a switch is turned off.

The operation of the load driver 3 having the configuration in FIG. 5 will be described according to the time chart of FIG. 6.

(Period a) In a state where AW Y1, SW Y4, SW M1, and SW M4 are on, 1-A is at the potential H, 1-B is at the potential L, 2-A is at the potential L, and 2-B is at the potential H.

(Period b) SW M1 is turned off. This period is a period for preventing SW M1 and SW3 from simultaneously being turned on, for which the duration of about one microsecond suffices.

(Period c) SW3 is turned on. LC resonance occurs among the load capacity 52, the coil L1 and the external capacitor 53, and the charge is transferred from the terminal 2-B to the external capacitor 53. After all the charge transfers, SW3 is turned off.

(Period d) SW3 is turned off. This period is a period for preventing SW3 and SW M2 from simultaneously being turned on, for which the duration of about one microsecond suffices.

(Period e) SW Y1 is turned off, SW M2 is turned on, and SW M4 is turned off. This period is a period for preventing SW Y1 and SW6 from simultaneously being turned on, for which the duration of about one microsecond suffices.

(Period f) SW6 is turned on. LC resonance occurs among the load capacity 51, the coil L3 and the load capacity 52, and the charge is transferred from the terminal 1-A to the terminal 2-A. After all the charge transfers, SW3 is turned off.

(Period g) SW6 is turned off. This period is a period for preventing SW6 and SW M3 from simultaneously being turned on, for which the duration of about one microsecond suffices.

(Period h) SW Y2 is turned on, SW Y4 is turned off, and SW M3 is turned on. This period is a period for preventing SW Y4 and SW2 from simultaneously being turned on, for which the duration of about one microsecond suffices. Even when the voltage of the terminal 2-A does not reach Vmin+Vpp due to a power loss in the charge path, it can still have Vmin+Vpp by turning on the SW M3.

(Period i) SW2 is turned on. LC resonance occurs among the load capacity 51, the coil L1 and the external capacitor 53, and the charge is transferred from the external capacitor 53 to the terminal 1-B. After all the charge transfers, SW2 is turned off.

(Period j) SW2 is turned off. This period is a period in which SW2 and SW Y3 are prevented from simultaneously being turned on, for which the duration of about one microsecond suffices.

(Period k) SW Y3 is turned on. In this period, 1-A is at the potential L, 1-B is at the potential H, 2-A is at the potential H, and 2-B is at the potential L, i.e., the pulse state in this period is opposite to that in Period a.

(Period l) SW M3 is turned off. The duration of about one microsecond is sufficient for the period.

(Period m) SW4 is turned on. LC resonance occurs among the load capacity 52, the coil L1 and the external capacitor 53, and the charge is transferred from the terminal 2-A to the external capacitor 53. After all the charge transfers, SW5 is turned off.

(Period n) SW4 is turned off. This period is a period for preventing SW4 and SW M4 from simultaneously being turned on, for which the duration of about one microsecond suffices.

(Period o) SW Y3 is turned off, SW M2 is turned off, and SW M4 is turned on. This period is a period for preventing SW Y3 and SW5 from simultaneously being turned on, for which the duration of about one microsecond suffices.

(Period p) SW5 is turned on. LC resonance occurs among the load capacity 51, the coil L2 and the load capacity 52, and the charge is transferred from the terminal 1-B to the terminal 2-B. After all the charge transfers, SW5 is turned off.

(Period q) SW5 is turned off. This period is a period for preventing SW5 and SW Ml from simultaneously being turned on, for which the duration of about one microsecond suffices.

(Period r) SW Y2 is turned off, SW Y4 is turned on, and SW M1 is turned on. This period is a period in which SW Y2 and SW1 are prevented from simultaneously being turned on, for which the duration of about one microsecond suffices.

(Period s) SW1 is turned on. LC resonance occurs among the load capacity 51, the coil L1 and the external capacitor 53, and the charge is transferred from the external capacitor 53 to the terminal 1-A. After all the charge transfers, SW1 is turned off.

(Period t) SW1 is turned off. This period is a period in which SW1 and SW Y1 are prevented from simultaneously being turned on, for which the duration of about one microsecond suffices.

Then, SW Y1 is turned on, so that the state in Period a returns. By repeating Periods a to t, pulse waveforms of opposite phases can be applied to the both terminals of the load capacities 51 and 52.

As described above, in the load driver 3 of the first embodiment, the terminal 1-A, the terminal 1-B, the terminal 2-A, and the terminal 2-B are connected to the external capacitor 53 via the switch of each terminal and the common coil, the terminal 1-A and the terminal 2-A are connected via the coil and the switch, and the terminal 1-B and the terminal 2-B are connected via the coil and the switch. Accordingly, after releasing charge from the terminal 2-A to the external capacitor 53, current is released from the terminal 1-B to the terminal 2-B. After the discharge is completed, current can be released from the external capacitor 53 to the terminal 1-A. Thus, low power consumption by using resonance can be achieved. By controlling the switches as described above, voltage pulses of opposite phases can be applied to the both ends of the capacitive loads.

Modification 1

Figure 7:
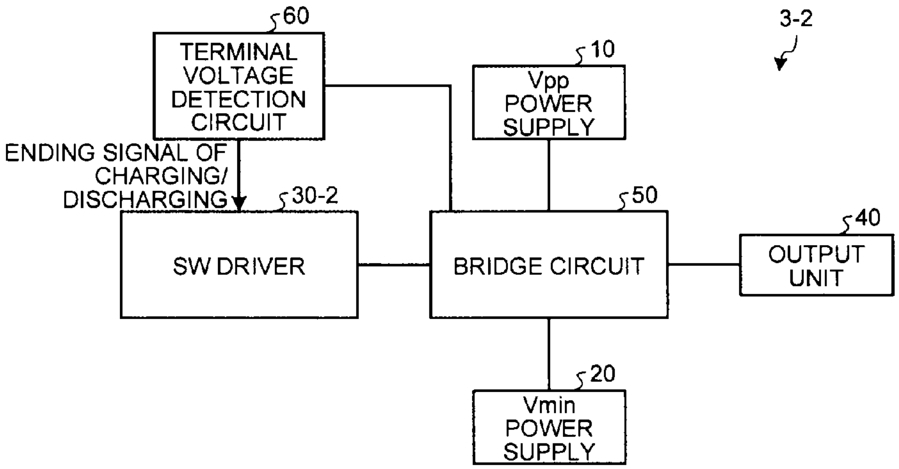
FIG. 7 is a block diagram of a configuration example of a load driver according to the modification 1.

FIG. 7 is a block diagram for a configuration example of a load driver 3-2 of Modification 1. The load driver 3-2 includes an SW driver 30-2, the bridge circuit 50, the Vpp power supply 10, the Vmin power supply 20, the output unit 40, and a terminal voltage detection circuit 60. The load driver 3-2 is different from the load driver 3 in FIG. 3 in that the load driver 3-2 includes the terminal voltage detection circuit 60 and that the SW driver 30-2 has a function different from the SW driver 30 in FIG. 3.

The terminal voltage detection circuit 60 is a circuit that detects terminal voltages of the load capacity 51, the load capacity 52, and the external capacitor 53.

The best power efficiency is obtained if charge/discharge switches SW1 to SW6 are turned off at the instant of complete charging or complete discharging. For this reason, the load driver 3-2 of Modification 1 further includes the terminal voltage detection circuit 60 that detects the terminal voltage of each of the load capacities and, when the terminal voltage reaches a predetermined voltage, the terminal voltage detection circuit 60 transmits an ending signal of charging/discharging to the SW driver 30-2. The predetermined voltage is Vmin+Vpp or Vmin, for example.

Upon receiving the ending signal of charging/discharging, the SW driver 30-2 turns off the switches SW1 to SW6. This increases the power efficiency.

Modification 2

Figure 8:
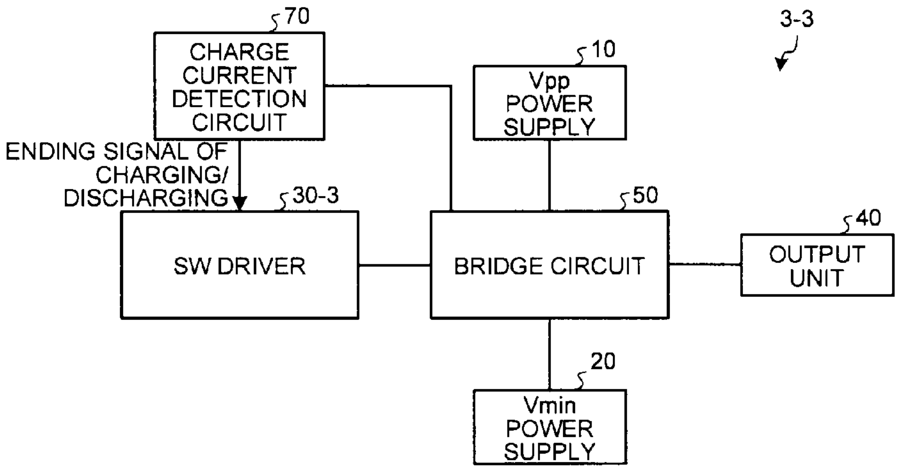
FIG. 8 is a block diagram of a configuration example of a load driver according to the modification 2.

FIG. 8 is a block diagram for a configuration example of a load driver 3-3 of Modification 2. The load driver 3-3 includes an SW driver 30-3, the bridge circuit 50, the Vpp power supply 10, the Vmin power supply 20, the output unit 40, and a charge current detection circuit 70. The load driver 3-3 is different from the load driver 3 in FIG. 3 in that the load driver 3-3 includes the charge current detection circuit 70 and that the SW driver 30-3 has a function different from the SW driver 30 in FIG. 3.

The charge current detection circuit 70 is a circuit that detects the current flowing into the charging/discharging coils (coils L1 to L3).

The current flowing into the charging/discharging coil forms a sine wave with respect to time. A charging/discharging process ends when the current becomes approximately 0. For this reason, the load driver 3-3 further includes the charging current detection circuit 70 and, when the current is 0, the charging current detection circuit 70 transmits an ending signal of charging/discharging to the SW driver 30-3.

Upon receiving the ending signal of charging/discharging, the SW driver 30-3 turns off the switches SW1 to SW6. This improves the power efficiency.

Modification 3

Turning on/off of each switch is controlled by the SW driver 30 and the turning timing is determined by a circuit constant of the SW driver 30. Because the circuit constant varies, the timing of turning on/off each switch may deviate from an aimed timing.

For example, in a case where the SW3 is turned on in Period c to release charge from 2-B to the external capacitor 53, if the timing to turned off the SW3 is delayed and the SW3 is kept on even after the discharging process ends, resonance causes a current to flow in a direction opposite to the discharging direction, i.e., a current flows from the external capacitor 53 to 2-B. Because FETs are usually used as switches, a current flowing in a reverse direction may cause a problem such as a dielectric breakdown. Furthermore, if the timing at which SW3 is turned off becomes earlier and the SW3 is turned off before the discharging ends, a counter electromotive voltage may occur in the coil L1 to cause a breakdown of the FET.

Figure 9:
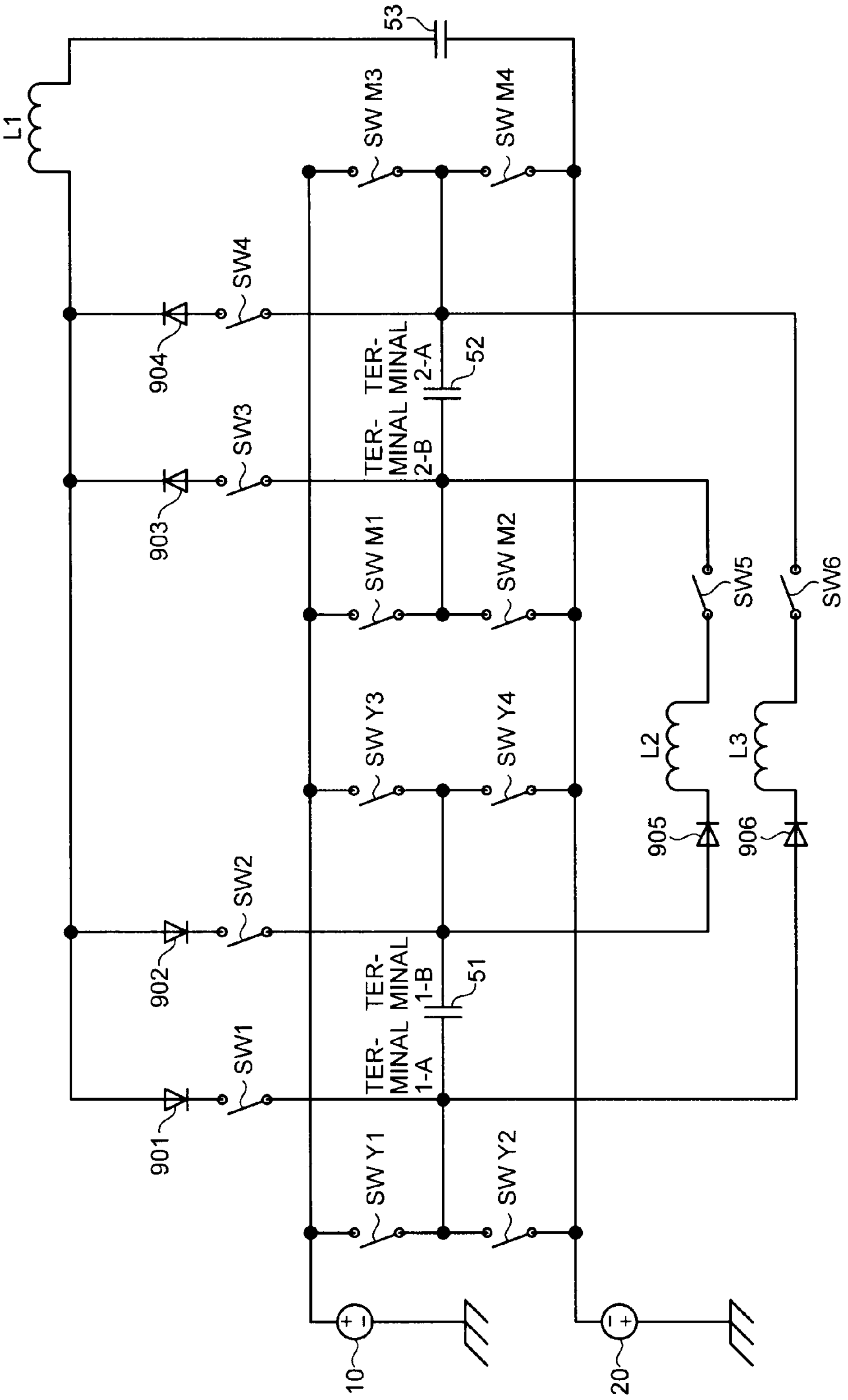
FIG. 9 is a diagram of a configuration example of a load driver according to the modification 3 including reverse-current protection diodes.

For this reason, Modification 3 provides a configuration further including diodes that prevent a reverse current flowing into the FETs. FIG. 9 is a diagram for a configuration example of a load driver of Modification 3 including reverse-current protection diodes. As shown in FIG. 9, the load driver of Modification 3 includes reverse-current protection diodes 901 to 906.

Such a configuration can prevent a breakdown caused by a reverse current flowing into an FET. Furthermore, because a reverse current does not occur, SW1 to SW6 can be kept on for a period sufficiently longer than the duration necessary for charging/discharging. This can prevent the occurrence of a counter electromotive voltage, which is caused by turning off a switch before the discharging ends, and thus prevents the FET from having a breakdown.

Figure 10:
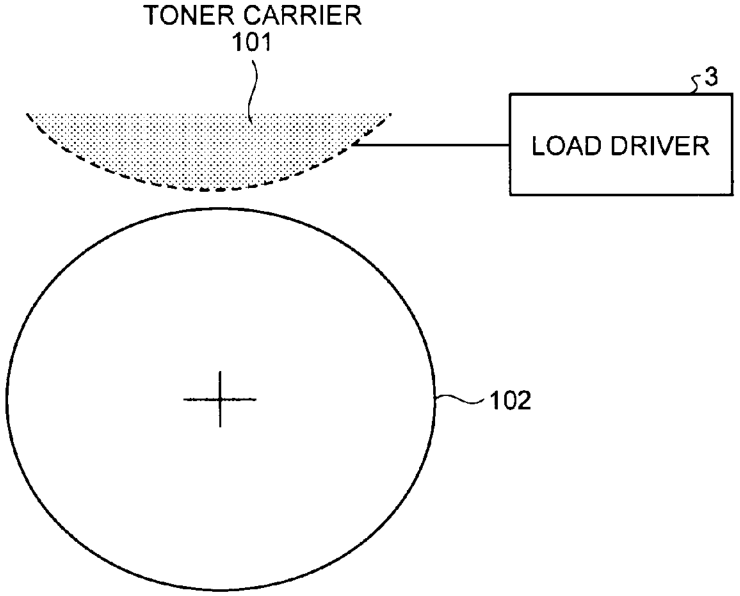
FIG. 10 is a diagram illustrating a configuration example of a developing unit.

The configuration example for the developing unit 4 of the image forming apparatus will be described here. FIG. 10 is a diagram illustrating the configuration example of the developing unit 4. As shown in FIG. 10, the developing unit 4 includes a toner carrier 101 that carries toner, which is an image developer, and a photosensitive element 102, such as an organic photosensitive element (OPC).

The load driver 3 applies a cloud pulse to the toner carrier 101, thus generating a toner cloud, and develops a toner image on the photosensitive element 102.

Figure 11:
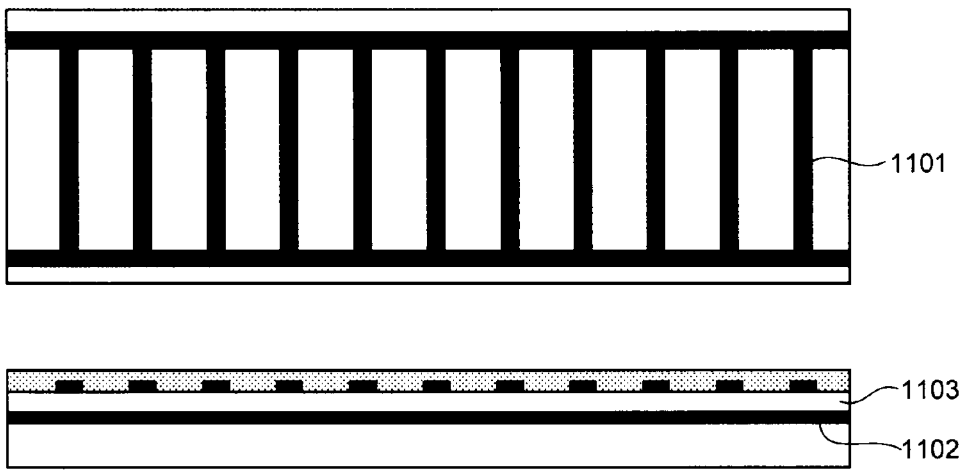
FIG. 11 is a diagram illustrating a configuration example of a toner carrier.

FIG. 11 is a diagram illustrating a configuration example of the toner carrier 101. The toner carrier 101 includes a plurality of electrodes 1101 that extend in a direction perpendicular to the toner conveying direction and that are arranged at a predetermined interval on the surface of the toner carrier 101. A toner cloud can be generated by applying cloud pulses of opposite phases between a conductive base material 1102, which is a lower-layer electrode, and the electrodes 1101 provided with an insulating layer 1103 being interposed between the conductive base material 1102 and the electrodes 1101. The lower layer conductive base material 1102 and the electrodes 1101 form the capacitive loads.

Figure 12A:
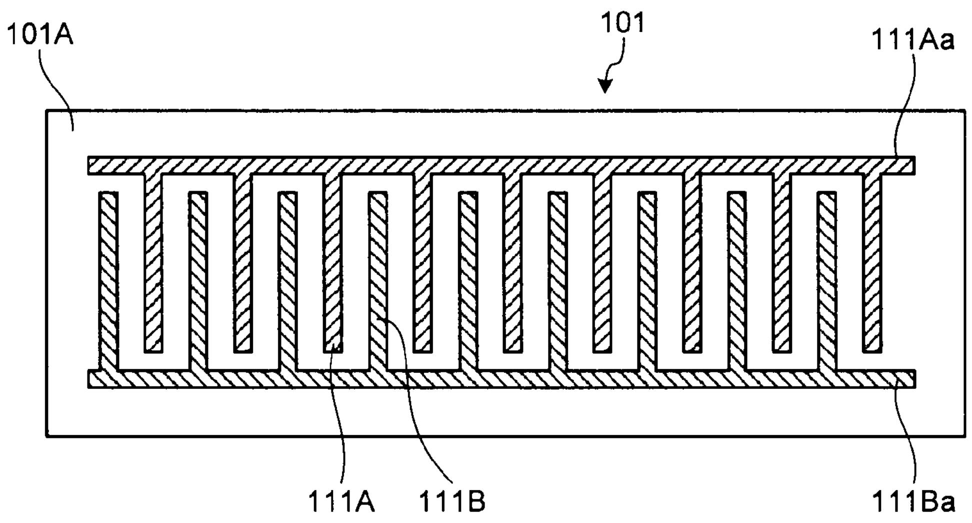
FIGS. 12A and 12B are diagrams illustrating another configuration example of a toner carrier.
Figure 12B:
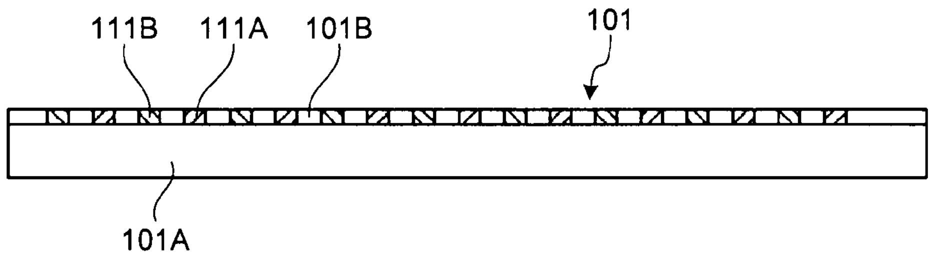

FIGS. 12A and 12B are diagrams illustrating another configuration example of the toner carrier 101. FIG. 12A is a schematic plan view illustrating the exploded toner carrier 101 and FIG. 12B is a schematic cross-sectional view of the toner carrier 101.

This is an example of the toner carrier 101 including two-phase electrodes consisting of two sets of electrodes alternately arranged. By applying pulses of two phases that are different from each other by 180 degrees (see FIG. 2), electric fields of two phases that cause repetition of attraction and repulsion of adjacent electrodes are formed.

In the toner carrier 101, A-phase electrodes 111A and B-phase electrodes 111B are provided as a plurality of electrodes 111 on a surface of an insulating base material 101A and a surface protective layer 101B is provided on the electrodes 111. The comb-shaped electrodes 111A and 111B are provided in parallel with a fine pitch in the direction perpendicular to the toner conveying direction and are connected to the load driver 3, which is a two-phase pulse generating circuit, respectively via common bus lines 111Aa and 111Ba on both sides.

Pulse voltages applied to the electrodes 111A and 111B have a frequency of 0.5 kHz to 7 kHz and contain a DC bias voltage. Pulse voltages with a varying pulse height of ±60 to ±300 volts, for example, are applied in accordance with the electrode width or the electrode interval. In the case of the two-phase electric fields, repulsive fly and attractive fly of the toner are repeated according to the switching in the electric field directions between adjacent electrodes so that the toner reciprocates between the electrodes. The entire toner carrier 101 moves by rotation in the toner-conveying direction.

As described above, the means for flying the toner on the surface of the toner carrier 101 to generate a toner cloud includes the electrodes, which extend in the direction perpendicular to the toner conveying direction and are provided at predetermined intervals on the surface of the toner carrier 101; the voltages, which are in the directions for attracting and repulsing the toner between adjacent electrodes and are alternately and repeatedly applied to each electrode; and the toner carrier 101, which moves by rotation so that the toner can be conveyed and a toner cloud can be generated. Accordingly, the toner can be stably conveyed on the surface of the toner carrier 101 without depending on the toner charge quality and thus a reliable image forming apparatus can be implemented.

Figure 13:
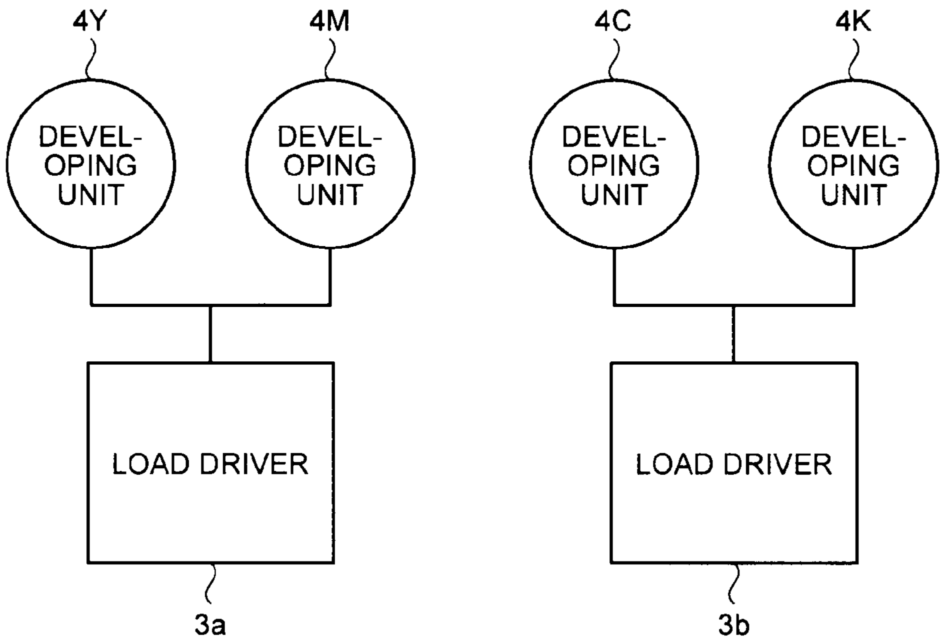
FIG. 13 is a diagram illustrating a configuration example of a toner carrier of an image forming apparatus that forms a color image.

FIG. 13 is a diagram illustrating a configuration example for the toner carrier of an image forming apparatus that forms a color image.

In a case where an image forming apparatus that forms color images includes a plurality of developing units, a configuration in which the image forming apparatus has one load driver 3 for two developing units is the most efficient from the viewpoint of power consumption, space for board arrangement, and cost. FIG. 13 shows an example in which, regarding four colors (Y, M, C, and K) of a color image, developing units 4Y and 4M corresponding to Y and M, respectively, are driven by a load driver 3*a* and developing units 4C and 4K corresponding to C and K, respectively, are driven by a load driver 3*b*.

In cloud development, Vmin in FIG. 2 affects the image density and Vpp affects the cloud quality of the toner. Therefore, a configuration may be adopted in which Vmin and Vpp are independently controlled. This configuration enables the adjustment of the image density without affecting the cloud quality, and the cloud content can be adjusted without affecting the image density. Independent control of Vmin and Vpp is enabled by the independent output of a Vpp control signal and a Vmin control signal by the control board 2.

Second Embodiment

In a case where multiple rollers are used, it is desirable that, in order to optimize the cloud development quality, the voltage applied to each developing roller can be individually set. In the first embodiment, however, the pulse height in the voltage of the two capacitive loads (the load capacity 51 and the load capacity 52) can be set only as a common value Vpp. In the second embodiment, by using diodes, voltage pulses each with an individual pulse height can be applied to each of the capacitive loads.

Figure 14:
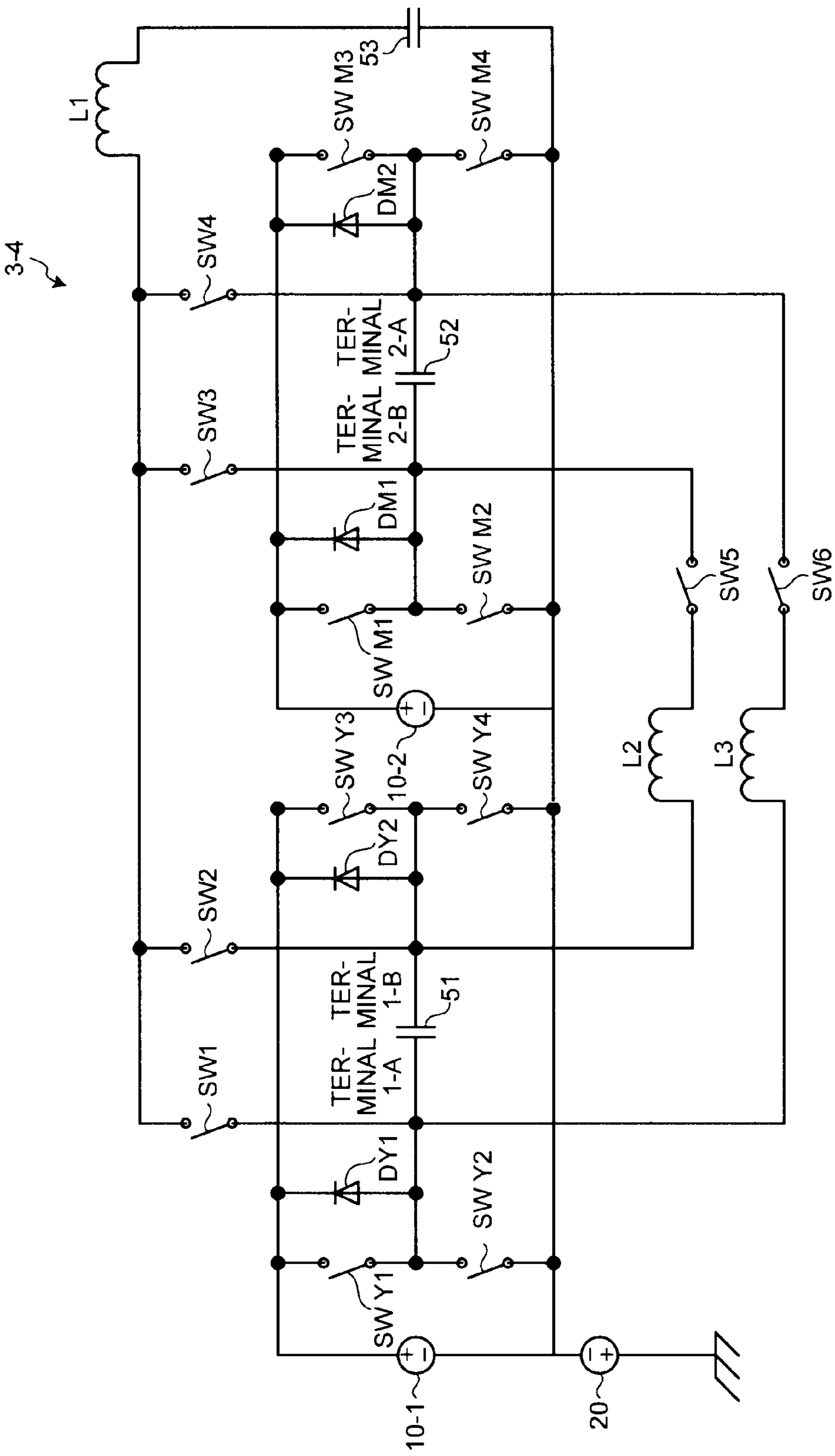
FIG. 14 is a diagram of a detailed configuration example of a load driver according to a second embodiment.

FIG. 14 is a diagram for a detailed configuration example of a load driver 3-4 according to a second embodiment. As shown in FIG. 14, the load driver 3-4 includes, instead of the Vpp power supply 10 in FIG. 5, two power supplies: a Vpp1 power supply 10-1 and a Vpp2 power supply 10-2. The load driver 3-4 further includes diodes DY1, DY2, DM1, and DM2.

The Vpp1 power supply 10-1 outputs a voltage value Vpp1. The Vpp1 power supply 10-2 outputs a voltage value Vpp2.

The load capacity 51 is connected to the Vpp1 power supply 10-1 via the switches (SW Y1 and SW Y3) and is connected to the Vmin power supply 20 via the switches (SW Y1 and SW Y4). The load capacity 51 is connected to a diode DY1 and a diode DY2, each with an anode on the terminal side and a cathode on the power supply side.

The load capacity 52 is connected to the Vpp2 power supply 10-2 via the switches (SW M1 and SW M3) and is connected to the Vmin power supply 20 via the switches (SW M2 and SW M4). The load capacity 52 is connected to a diode DM1 and a diode DM2, each with an anode on the terminal side and a cathode on the power supply side.

An operation of the load driver having the configuration in FIG. 14 will be described below according to the time chart in FIG. 6. The time chart in FIG. 6 is the same as the time chart of the first embodiment. Hereinafter, changes in potential of the terminals in the period in which the potential of the terminals changes in the time chart will be described.

(Period f) In Period f, when Vpp1>Vpp2, the diode DM2 conducts and the potential of the terminal 2-A is fixed at Vpp2. When Vpp1<Vpp2, the potential of the terminal 2-A becomes Vpp1.

(Period h) In Period h, when Vpp1<Vpp2, SW M3 is turned on and thus the potential of the terminal 2-A becomes Vpp2.

(Period i) In Period i, when Vpp1>Vpp2, the potential of the terminal 1-B becomes Vpp2. When Vpp1<Vpp2, the diode DY2 conducts and the potential of the terminal 1-B is fixed at Vpp1.

(Period k) In Period k, when Vpp1>Vpp2, SW Y3 is turned on and thus the potential of the terminal 1-B becomes Vpp1.

(Period p) In Period p, when Vpp1>Vpp2, the diode DM1 conducts and the potential of the terminal 2-B is fixed at Vpp2. When Vpp1<Vpp2, the potential of the terminal 1-B becomes Vpp1.

(Period r) In Period r, when Vpp1<Vpp2, SW Ml is turned on and thus the potential of the terminal 2-B becomes Vpp2.

(Period s) In Period s, when Vpp1>Vpp2, the potential of the terminal 1-A becomes Vpp2. When Vpp1<Vpp2, the diode DY1 conducts and the potential of the terminal 1-A is fixed at Vpp1.

After Period t, SW Y1 is turned on so that the state in Period a returns. When Vpp1>Vpp2, SW Y1 is turned on and thus the potential of the terminal 1-B becomes Vpp1.

Figure 15:
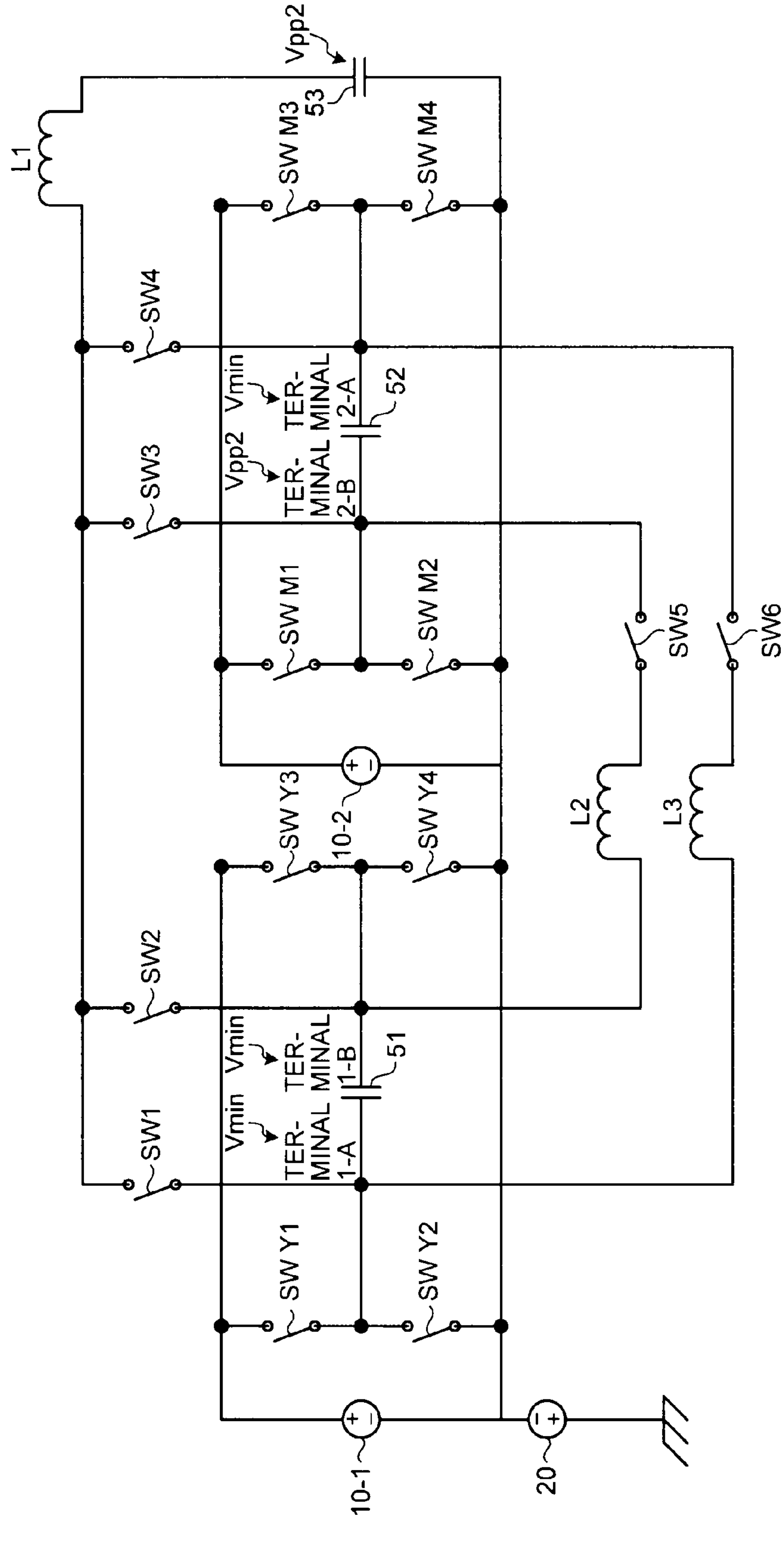
FIG. 15 is a diagram illustrating an operation of a load driver without diodes.
Figure 16:
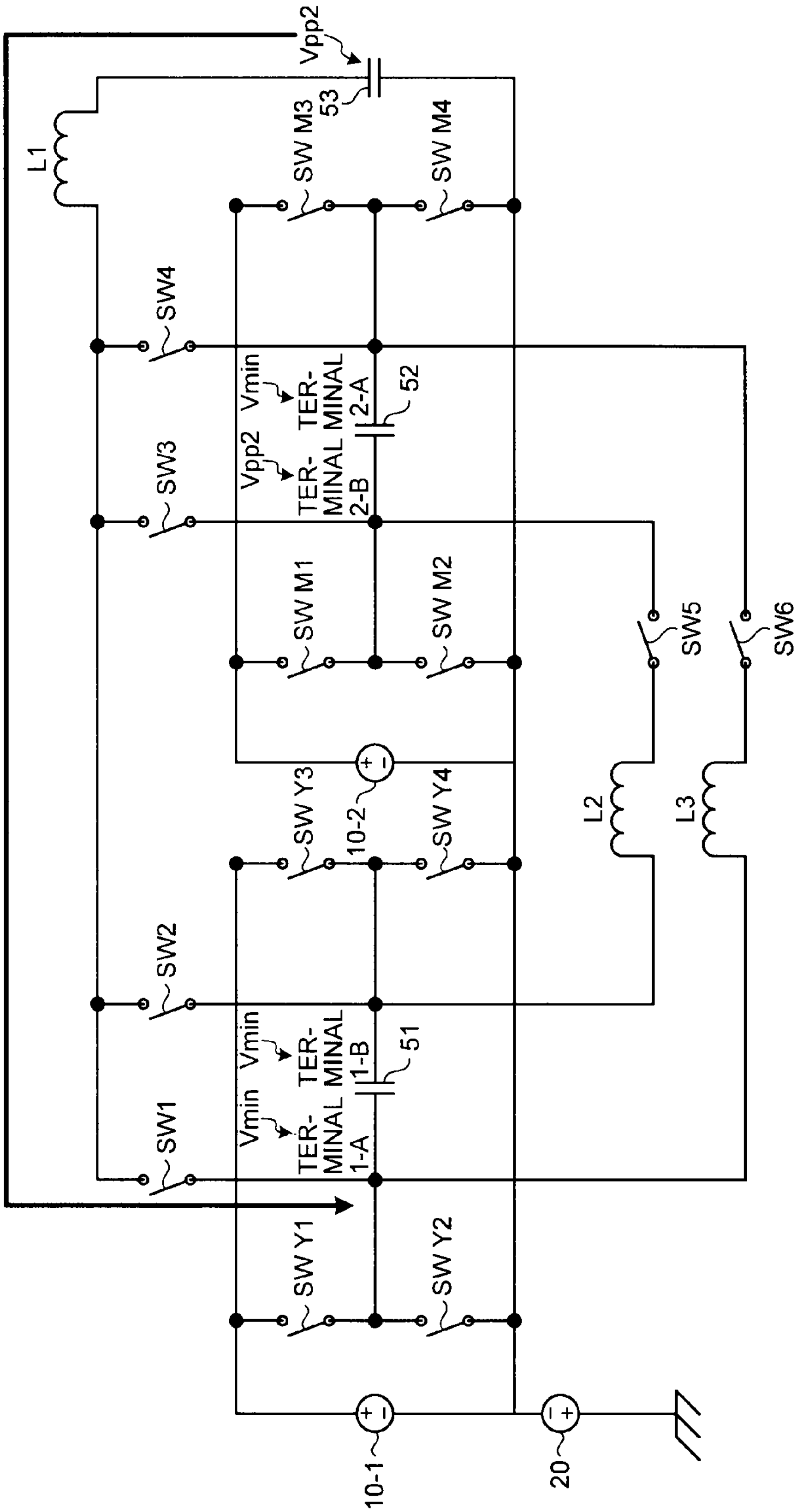
FIG. 16 is a diagram illustrating an operation of a load driver without diodes.
Figure 17:
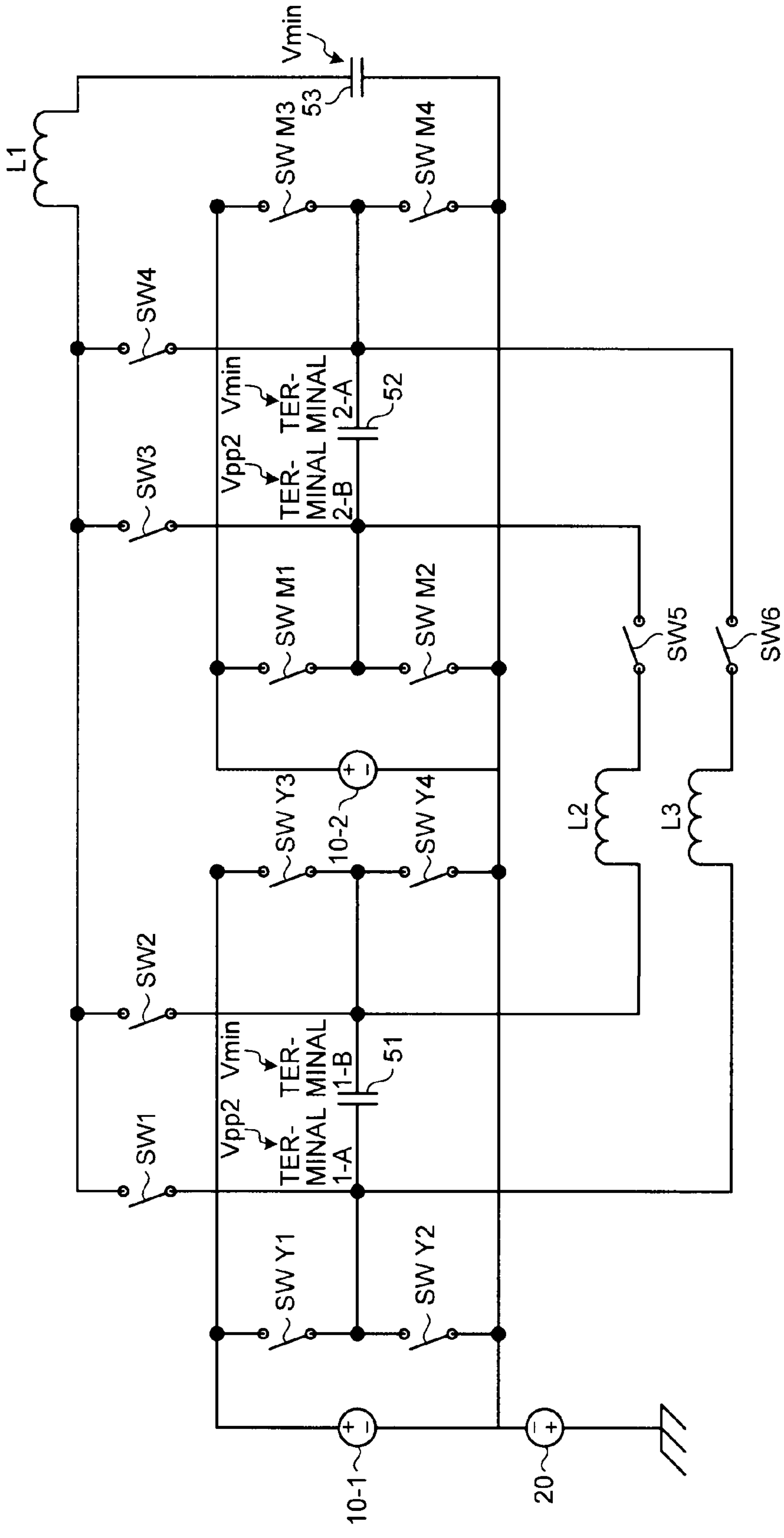
FIG. 17 is a diagram illustrating an operation of a load driver without diodes.

Effects of the diodes will be described with reference to FIGS. 15 to 20. FIGS. 15 to 17 are diagrams illustrating operations of a load driver that does not include any diodes. That is, FIGS. 15 to 17 illustrate an example of the load driver obtained by excluding the diodes DY1, DY2, DM1, and DM2 from the load driver apparatus in FIG. 14.

If there is no diode, before charge is supplied to the terminal 1-A by using resonance, as shown in FIG. 15, the potential of the external capacitor 53 is Vpp2, the potentials of the terminals 1-A, 1-B, and 2-A are Vmin, and the potential of the terminal 2-B is Vpp2.

Turning on SW1 causes resonance and the supply of a charge of Vpp2 from the external capacitor 53 to the terminal 1-A starts (FIG. 16). After the charge-supply ends, as shown in FIG. 17, the potential of the external capacitor 53 becomes Vmin, the potentials of the terminals 1-B and 2-A become Vmin, and the potentials of the terminals 1-A and 2-B become Vpp2. As described above, when there is no diode, the potentials of the terminal 1-A cannot become Vpp1, which is a desired potential, by charging.

Figure 18:
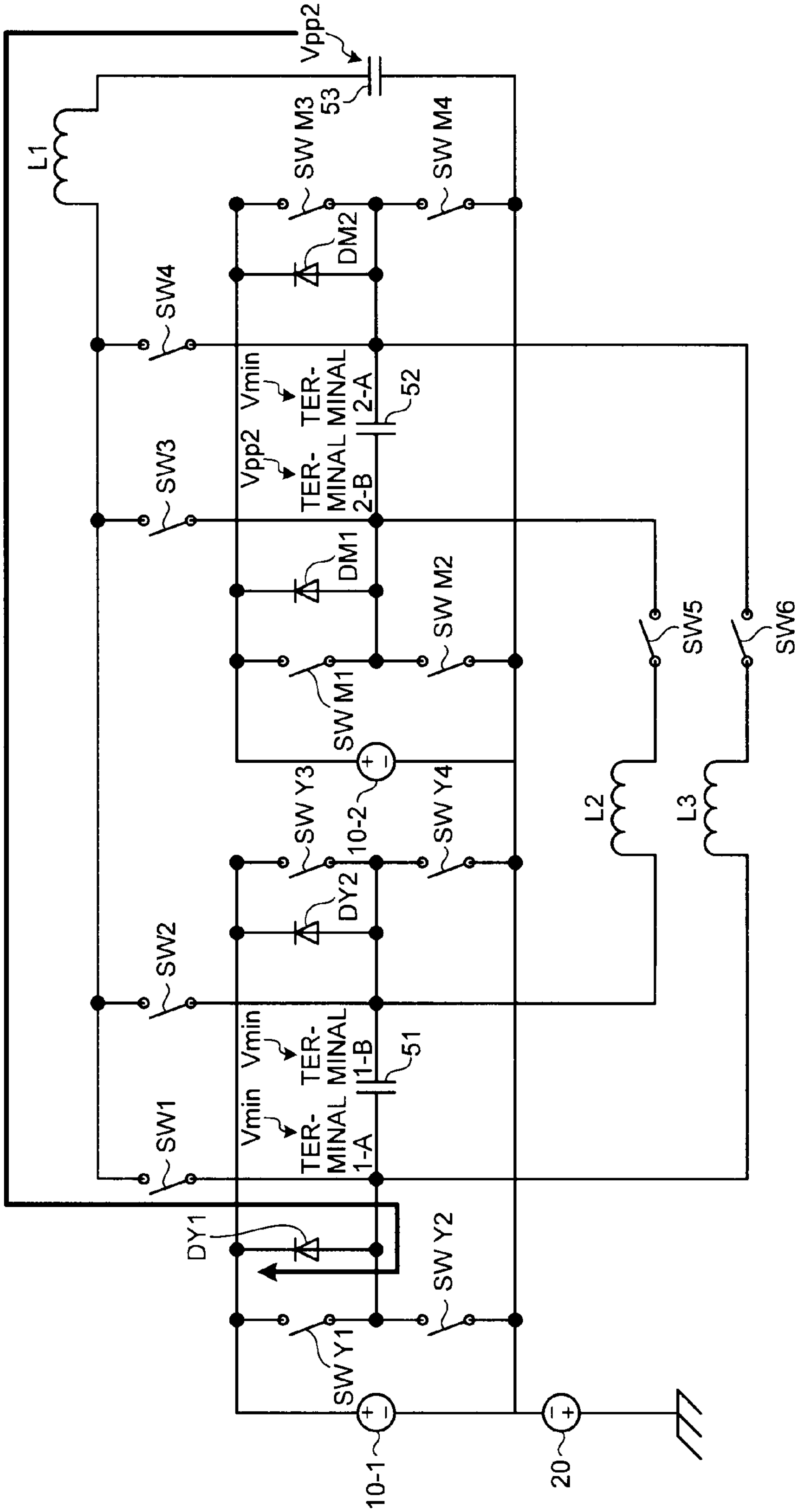
FIG. 18 is a diagram illustrating an operation of the load driver in FIG. 14.
Figure 19:
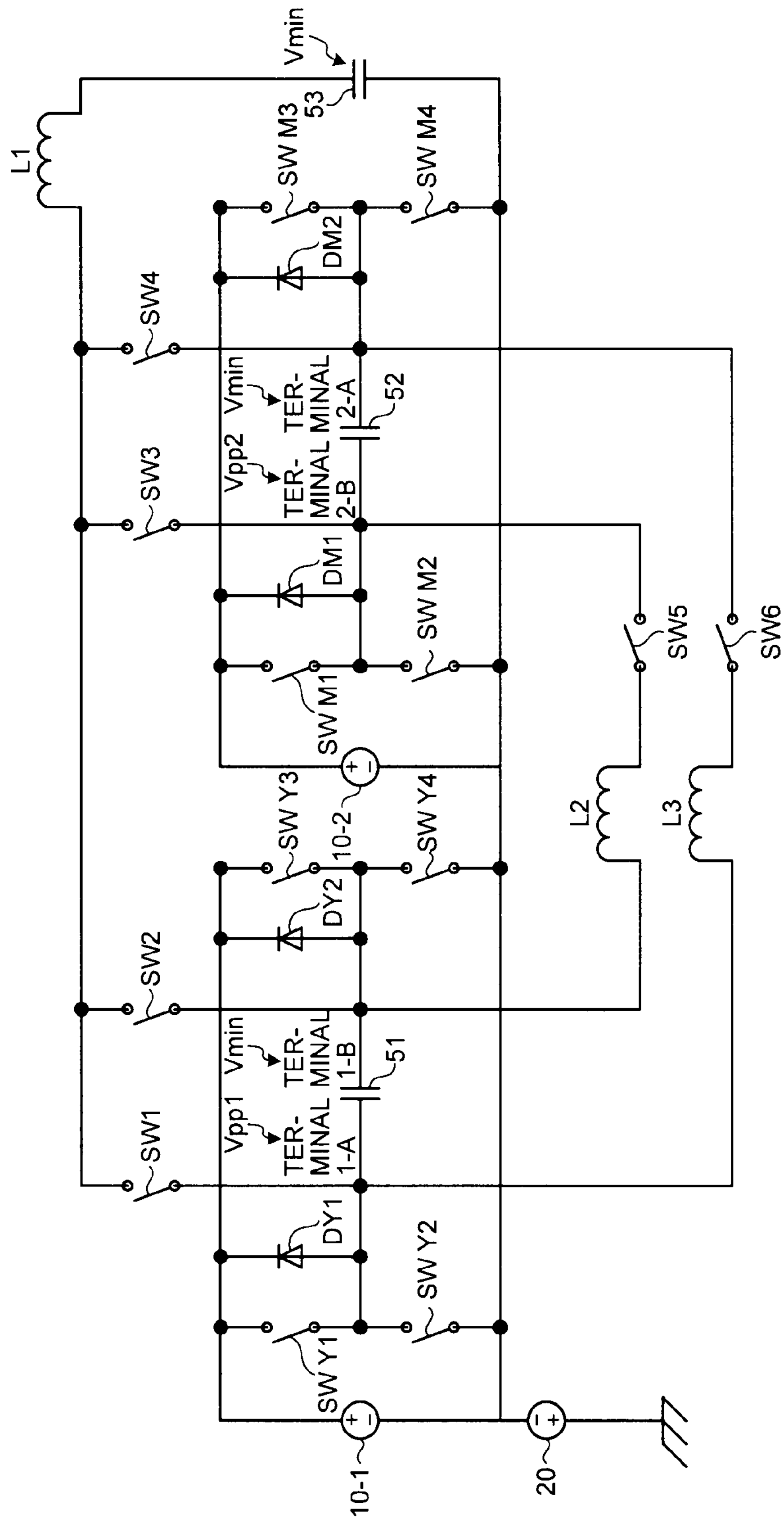
FIG. 19 is a diagram illustrating an operation of the load driver in FIG. 14.
Figure 20:
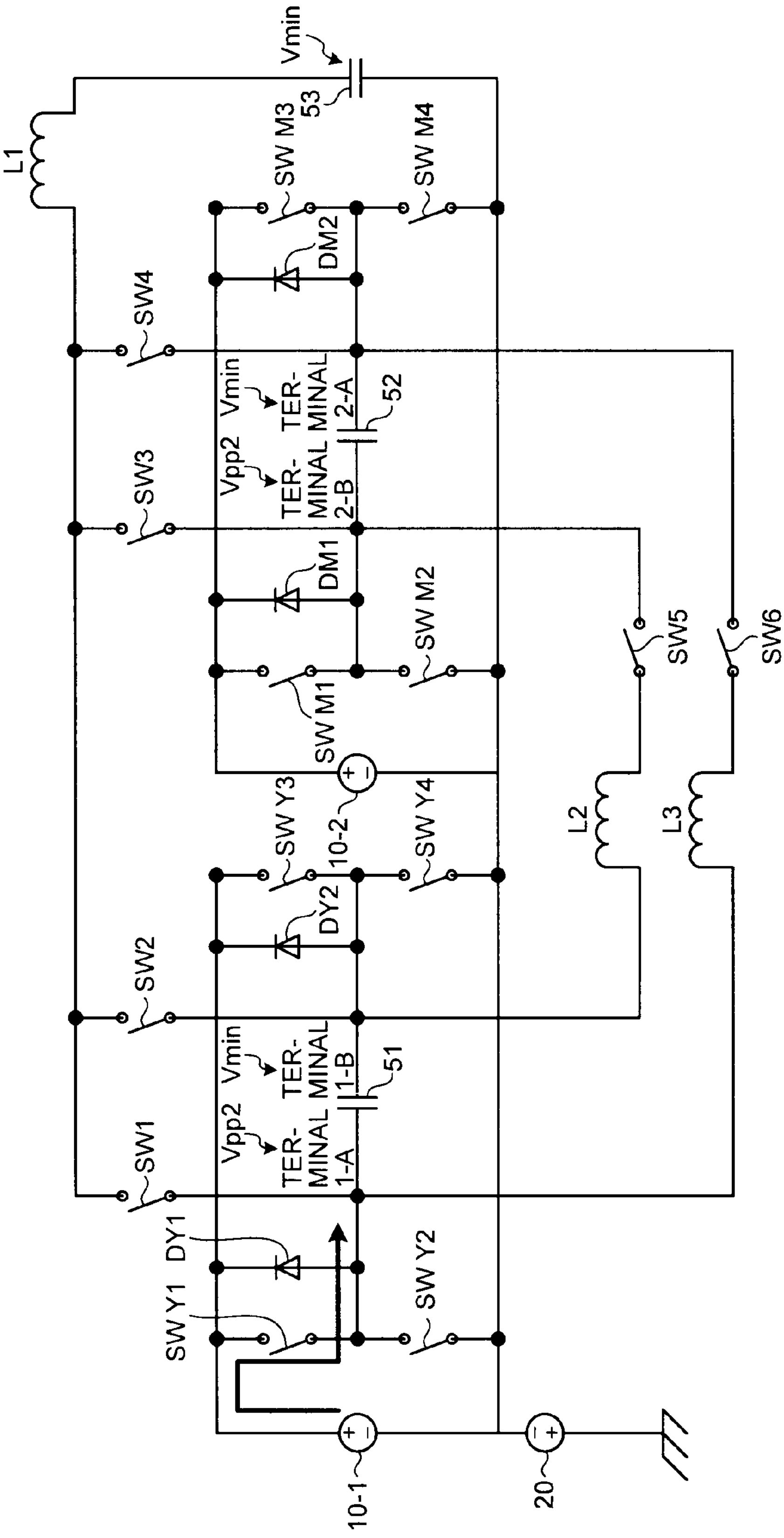
FIG. 20 is a diagram illustrating an operation of the load driver in FIG. 14.

FIGS. 18 to 20 are diagrams illustrating an operation of the load driver 3-4 that includes the diodes shown in FIG. 14.

As for the configuration including the diodes in FIG. 14, when Vpp1<Vpp2, the diode DY1 conducts when Vpp2 is supplied from the external capacitor 53 to the terminal 1-A. Thus, the potential of the terminal 1-A is fixed at Vpp1 (FIG. 18).

After the charge supply ends, as shown in FIG. 19, the potential of the external capacitor 53 becomes Vmin, the potentials of the terminals 1-B and 2-A become Vmin, the potential of the terminal 1-A becomes Vpp1, and the potential of the terminal 2-B becomes Vpp2. As described above, when there are diodes, charge of the desired potential Vpp1 can be supplied to the terminal 1-A.

When Vpp1>Vpp2, as in the case of FIG. 17, the terminal 1-A has Vpp2 that is smaller than the desired potential Vpp1. Thereafter, by turning on SW Y1, charge is supplied from the Vpp1 power supply to the terminal 1-A as shown in FIG. 20. Thus, the terminal 1-A has the desired potential Vpp1.

As described above, according to the second embodiment, a pulse having a desired peak voltage can be applied to each of the load capacities. For example, when Vpp1>Vpp2, charge with a potential equal to or larger than the desired potential Vpp2 is supplied to the load capacity 52. However, the presence of the diode prohibits the potential of the load capacity 52 to exceed Vpp2. Because Vpp2 is supplied by resonance to the load capacity 51, the potential of the load capacity 51 remains lower than the desired potential Vpp1. However, after the charging process ends, the power supply Vpp1 is connected to the load capacity 51 and thus the potential of the load capacity 51 becomes Vpp1. In this manner, the pulse height of the voltage can be controlled individually.

Modification 4

Figure 21:
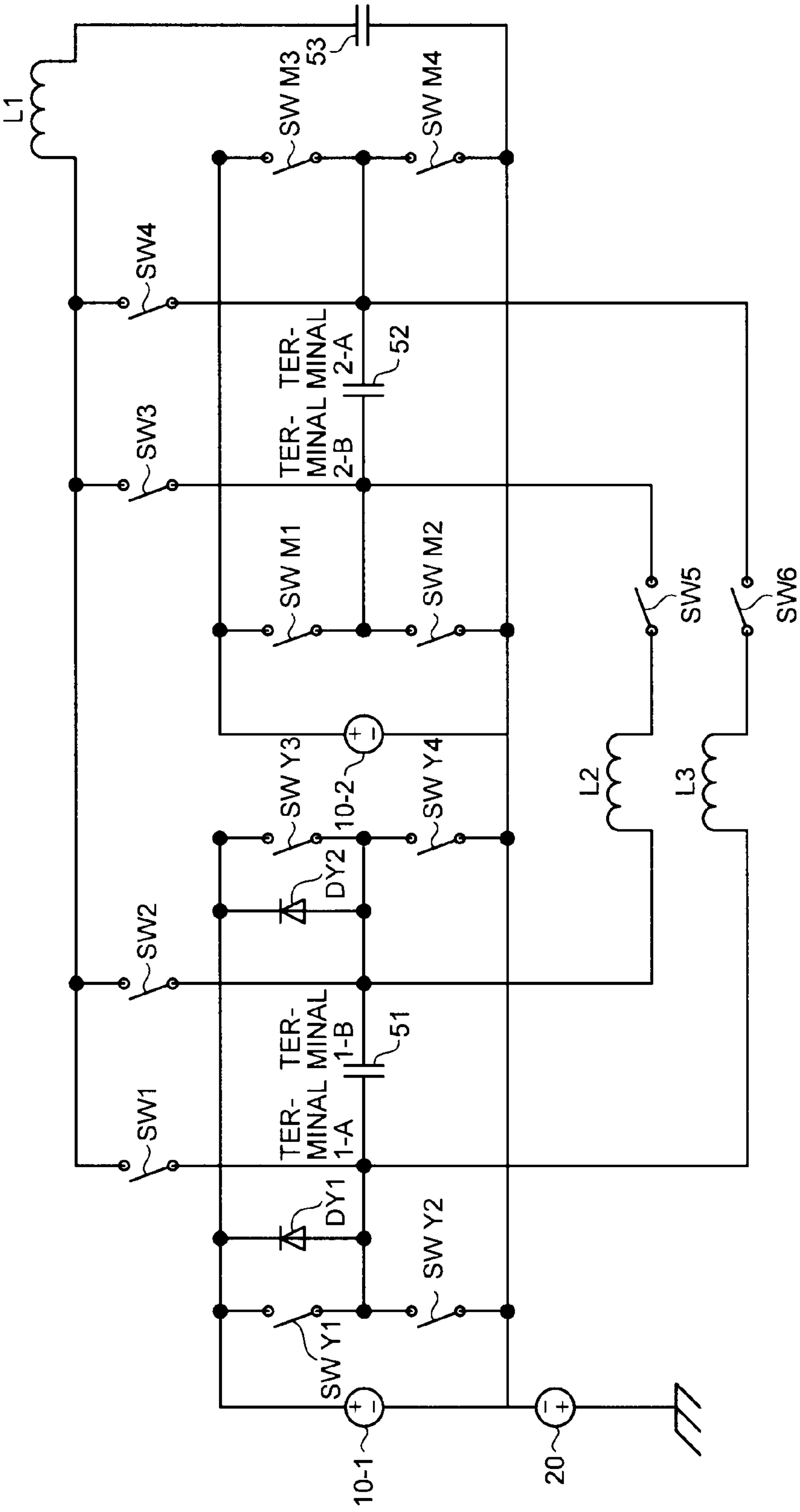
FIG. 21 is a diagram of a configuration example of a load driver of Modification 4.

In the second embodiment, the relation in the voltage between the Vpp1 power supply 10-1 and the Vpp2 power supply 10-2, concerning which one is larger than the other, can be arbitrarily set. In contrast, when the relation in the voltage between the Vpp1 power supply 10-1 and the Vpp2 power supply 10-2 is fixed, diodes are only to be connected to one of the load capacities that is connected to a power supply with a lower voltage. For example, when Vpp1<Vpp2, it is sufficient if the diode DY1 and the diode DY2 are provided. FIG. 21 is a diagram for a configuration example of a load driver of Modification 4 configured as described above. The configuration in FIG. 21 can reduce the number of elements and the cost.

Modification 5

Figure 22:
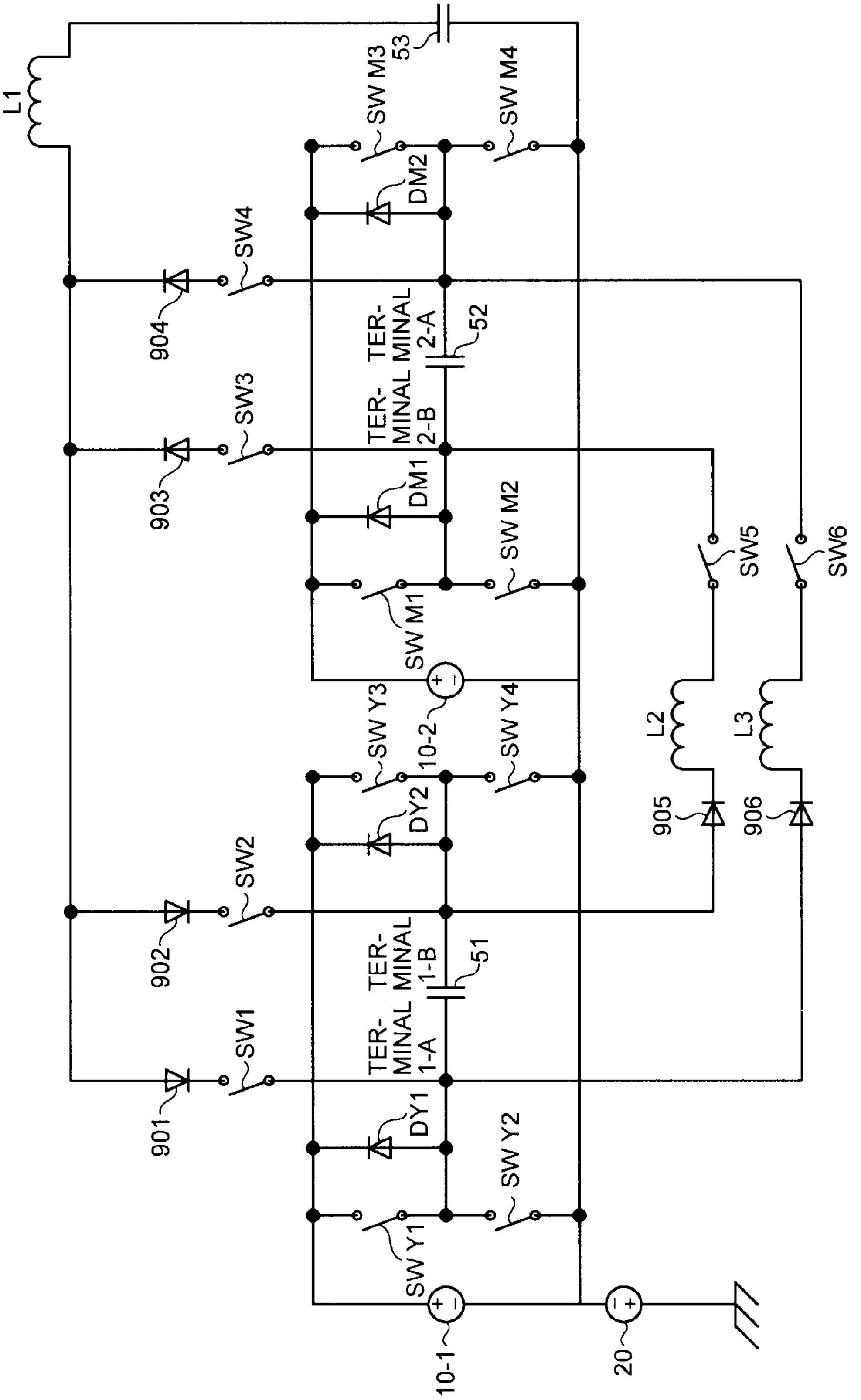
FIG. 22 is a diagram of a configuration example of a load driver according to the modification 5.

In Modification 5, as in the case of Modification 3, the load driver 3-4 (FIG. 14) of the second embodiment further includes diodes for preventing reverse current flowing into the FETs. FIG. 22 is a diagram for a configuration example of a load driver of Modification 5 including reverse-current protection diodes. As shown in FIG. 22, the load driver of Modification 5 includes the reverse-current protection diodes 901 to 906. As in the case of Modification 3, an effect of preventing a breakdown caused by a reverse current flowing into the FET can be obtained.

Figure 23:
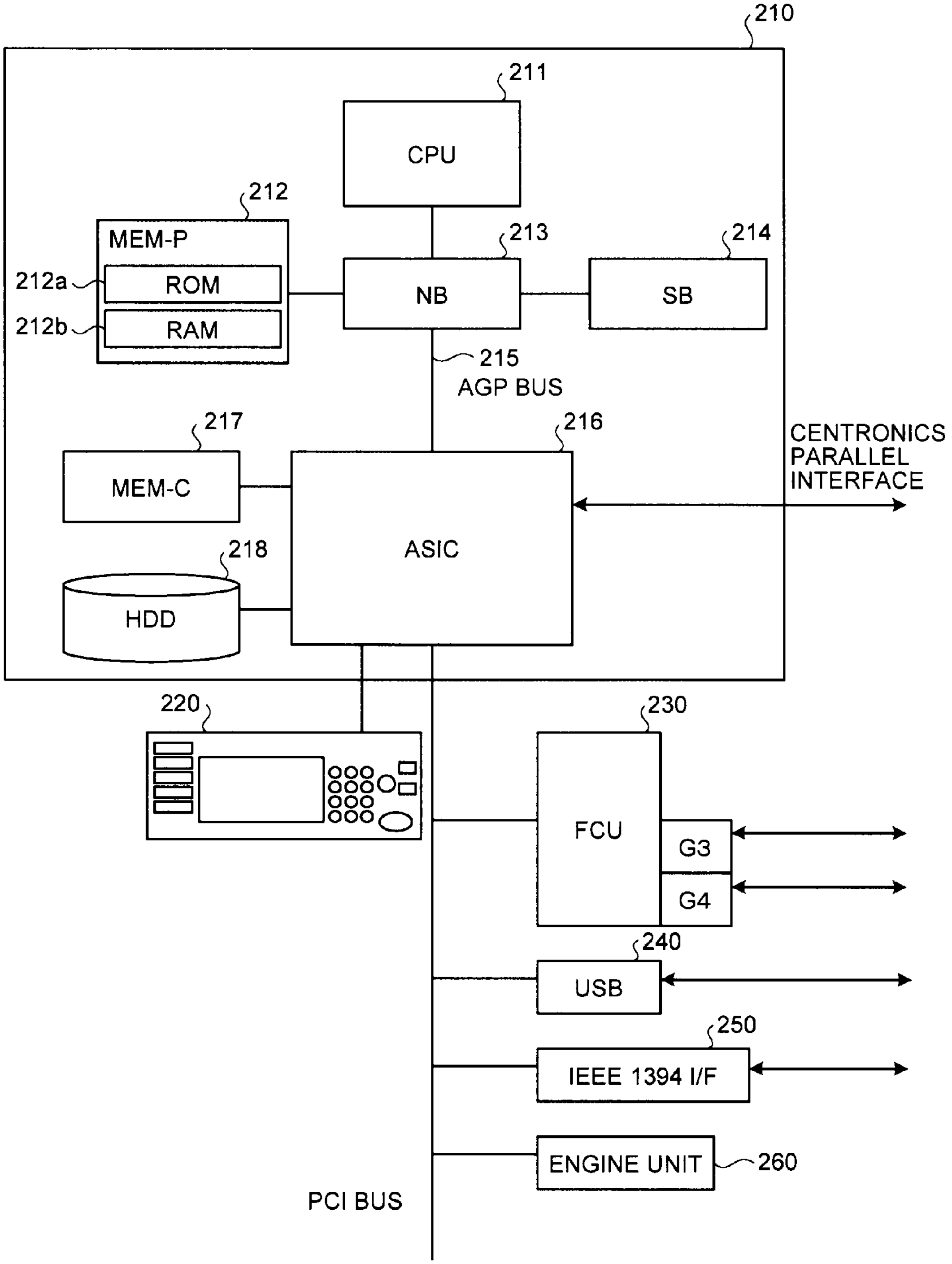
FIG. 23 is a block diagram of a hardware configuration of the image forming apparatuses according to the first and second embodiments.

FIG. 23 is a block diagram for a hardware configuration of the image forming apparatuses according to the first and second embodiments. As shown in FIG. 23, each of the printing apparatuses includes a controller 210 and an engine unit 260 that are connected to each other via a peripheral component interface (PCI) bus. The controller 210 is a controller that controls whole of the image forming apparatus and controls drawing, communications, and inputs from an operation unit (not shown). The controller 210 corresponds to, for example, the control board 2. The engine unit 260 is, for example, a printer engine that is connectable to the PCI bus, and can be a black/white plotter, a single-drum color plotter, a four-drum color plotter, a scanner, a facsimile unit, and the like. The engine unit 260 includes, in addition to a unit called an engine unit, such as a plotter, an image processing unit for error dispersion or gamma conversion.

The controller 210 includes a CPU 211, a north bridge (NB) 213, a system memory (MEP-P) 212, a south bridge (SB) 214, a local memory (MEM-C) 217, an application specific integrated circuit (ASIC) 216, and a hard disk drive (HDD) 218. The NB 213 and the ASIC 216 are connected via an accelerated graphics port (AGP) bus 215. The MEM-P 212 further includes a read only memory (ROM) 212*a* and a random access memory (RAM) 212*b*.

The CPU 211 controls whole of the image forming apparatus. The CPU 211 includes a chip set consisting of the NB 213, the MEM-P212, and the SB 214 and is connected to other devices via the chip set.

The NB 213 is a bridge for connecting the CPU 211 to the MEM-P212, the SB 214, and the AGP bus 215 and includes a memory controller that controls reading from and writing to the MEM-P 212, a PCI master, and an AGP target.

The MEM-P 212 is a system memory used as a memory for storing computer programs and data, a memory for loading the computer programs and the data, or a drawing memory for a printer. The MEM-P 212 includes the ROM 212*a* and the RAM 212*b*. The ROM 212*a* is a read-only memory used for storing computer programs and data. The RAM 212*b* is a rewritable and readable memory used for loading the computer programs and the data and used as a drawing memory for a printer.

The SB 214 is a bridge for connecting the NB 213 to PCI devices or peripheral devices. The SB 214 is connected to the NB 213 via the PCI bus. The network interface (I/F) unit is also connected to the PCI bus.

The ASIC 216 is an integrated circuit (IC) for image processing that includes hardware components for image processing. The ASIC 216 functions as a bridge for connecting the AGP bus 215, the PCI bus, the HDD 218, and the MEM-C 217. The ASIC 216 includes a PCI target, an AGP master, an arbiter (ARB) that plays a central role in ASIC216, a memory controller that controls the MEM-C 217, multiple direct memory access controllers (DMACs) that rotate image data by using hardware logic, and a PCI unit that transfers data to the engine unit 260 via the PCI bus. A facsimile controller (FCU) 230, a universal serial bus (USB) 240, and an IEEE1394 (the Institute of Electrical and Electronics Engineers 1394) interface 250 are connected to the ASIC 216 via the PCI bus. An operation display unit 220 is connected directly to the ASIC 216.

The MEM-C 217 is a local memory that is used as a copy image buffer and a code buffer. The HDD 218 is a storage unit for storing image data, computer programs, font data, and forms.

The AGP bus 215 is a bus interface for a graphic accelerator card developed for accelerating graphic processes. The AGP 215 accelerates the graphic accelerator card by directly accessing the MEP-P 212 at a high throughput.

Computer programs that are executed by the load drivers of the first and second embodiments are installed in the ROM or the like beforehand.

The computer programs that are executed by the load drivers of the first and second embodiments may be provided as a computer program product by being recorded in a computer-readable recording medium, such as a compact disc read-only memory (CD-ROM), a flexible disk (FD), a Compact Disc Recordable (CD-R), or a digital versatile disk (DVD) in a format that can be installed or in an executable format.

Furthermore, the computer programs that are executed by the load drivers of the first and second embodiments may be provided in a way that they are stored in a computer connected to a network, such as the Internet, such that they can be downloaded via the network. The computer programs that are executed by the load drivers of the first and second embodiments may be provided or distributed via a network, such as the Internet.

The computer programs that are executed by the load drivers of the first and second embodiments are configured as a module including each unit (SW driver) described above. As a hardware configuration, the CPU (processor) reads a computer program from the ROM and executes the computer program so that each unit described above is loaded and generated in the main storage unit.

In addition to a multifunction peripheral having at least two functions from a copy function, a printer function, a scanner function, and a facsimile function, any one of a copier, a printer, a scanner, or a facsimile device may be adopted as the image forming apparatus.

The present invention provides an effect of reducing power consumption by using resonance and applying voltage pulses of opposite phases to both ends of capacitive loads.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A load driver that applies pulse voltages to a first capacitive load and a second capacitive load, the first capacitive load including a first electrode and a second electrode and the second capacitive load including a third electrode and a fourth electrode, the load driver comprising:

a capacitor;

at least one coil; and a driver that connects the second capacitive load, the capacitor, and the coil to release charge from the third electrode to the capacitor, connects, after completion of releasing the charge to the capacitor, the first capacitive load, the second capacitive load, and the coil to release charge from the first electrode to the fourth electrode, connects, after completion of releasing the charge to the fourth electrode, the first capacitive load, the capacitor, and the coil to release charge from the capacitor to the second electrode, whereby the pulse voltages of opposite phases is applied to the first capacitive load and the second capacitive load from each other.

2. The load driver according to claim 1, further comprising:

a first power supply that outputs a first voltage value to the first capacitive load;

a second power supply that outputs a second voltage value to the second capacitive load;

a first diode with an anode connected to a side of the first electrode and a cathode connected to a side of the first power supply; and a second diode with an anode connected to a side of the second electrode and a cathode connected to the side of the first power supply.

3. The load driver according to claim 2, further comprising:

a third diode with an anode connected to a side of the third electrode and a cathode connected to a side of the second power supply; and a fourth diode with an anode connected to a side of the fourth electrode and a cathode connected to the side of the second power supply.

4. The load driver according to claim 1, further comprising a voltage detector that detects voltages of the first capacitive load, the second capacitive load, and the capacitor, wherein the driver determines completion of charge release when the detected voltage reaches a predetermined voltage value.

5. The load driver according to claim 1, further comprising a current detector that detects a current of the coil, wherein the driver determines completion of charge release when the detected current reaches a predetermined current value.

6. The load driver according to claim 1, further comprising at least any one of a diode with an anode connected to the capacitor and a cathode connected to the first capacitive load, a diode with an anode connected to the second capacitive load and a cathode connected to the capacitor, and a diode with an anode connected to the first capacitive load and a cathode connected to the second capacitive load.

7. An image forming apparatus comprising:

the load driver according to claim 1;

the first capacitive load and the second capacitive load that are included in a developer carrier that carries a developer; and a developing unit that develops a latent image formed on an image carrier with developer cloud generated from the developer with the pulse voltages that are applied to the developer carrier by the load driver.

8. The image forming apparatus according to claim 7, wherein the first electrode is provided on a surface of the first capacitive load that is included in the developer carrier, the second electrode is provided below the first electrode with an insulating layer interposed between the first electrode and the second electrode, the third electrode is provided on a surface of the second capacitive load that is included in the developer carrier, and the fourth electrode is provided below the third electrode with an insulating layer interposed between the third electrode and the fourth electrode.

9. The image forming apparatus according to claim 7, wherein the first electrode and the second electrode are provided on the surface of the first capacitive load that is included in the developer carrier, and the third electrode and the fourth electrode are provided on the surface of the first capacitive load that is included in the developer carrier.

10. The image forming apparatus according to claim 7, wherein the driver applies the pulse voltage at a specified minimum value.

11. The image forming apparatus according to claim 7, wherein the driver applies the pulse voltage at a specified pulse height.

12. A load driving method performed by a load driver that applies pulse voltages to a first capacitive load including a first electrode and a second electrode and to a second capacitive load including a third electrode and a fourth electrode, the load driver including a capacitor and at least one coil, the load driving method comprising:

connecting the second capacitive load, the capacitor, and the coil to release charge from the third electrode to the capacitor, connecting, after the releasing of the charge to the capacitor is completed, the first capacitive load, the second capacitive load, and the coil to release charge from the first electrode to the fourth electrode, and connecting, after the releasing of the charge to the fourth electrode is completed, the first capacitive load, the capacitor, and the coil to release charge from the capacitor to the second electrode.

13. A computer program product comprising a non-transitory computer-usable medium having computer-readable program codes embodied in the medium for causing a load driver that applies pulse voltages to a first capacitive load including a first electrode and a second electrode and to a second capacitive load including a third electrode and a fourth electrode and includes a capacitor and at least one coil to function as a driver, wherein the program codes, when executed, cause a computer to execute via the driver;

connecting the second capacitive load, the capacitor, and the coil to thereby release charge from the third electrode to the capacitor, connecting, after the releasing of the charge to the capacitor is completed, the first capacitive load, the second capacitive load, and the coil to thereby release charge from the first electrode to the fourth electrode, and connecting, after the releasing of the charge to the fourth electrode is completed, the first capacitive load, the capacitor, and the coil to thereby release charge from the capacitor to the second electrode.

* * * * *